Nov. 5, 1968  E. P. SUNDHOLM  3,409,185
GREASE GUN PLUNGER ASSEMBLY
Filed April 20, 1965  3 Sheets-Sheet 1
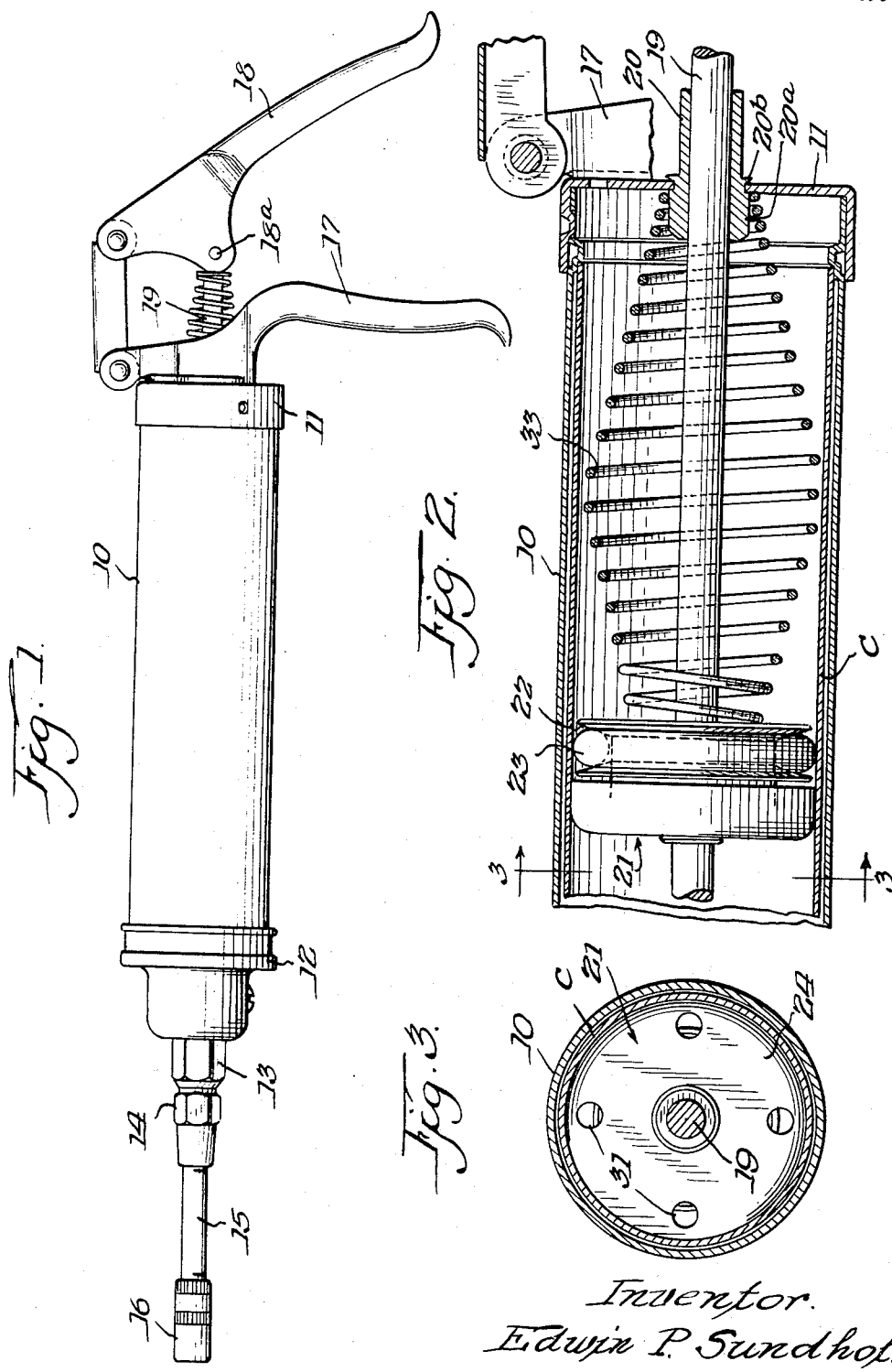
Inventor.
Edwin P. Sundholm.
By Dawson, Tilton, Fallon, Lungmus & Alexander.
Attys.

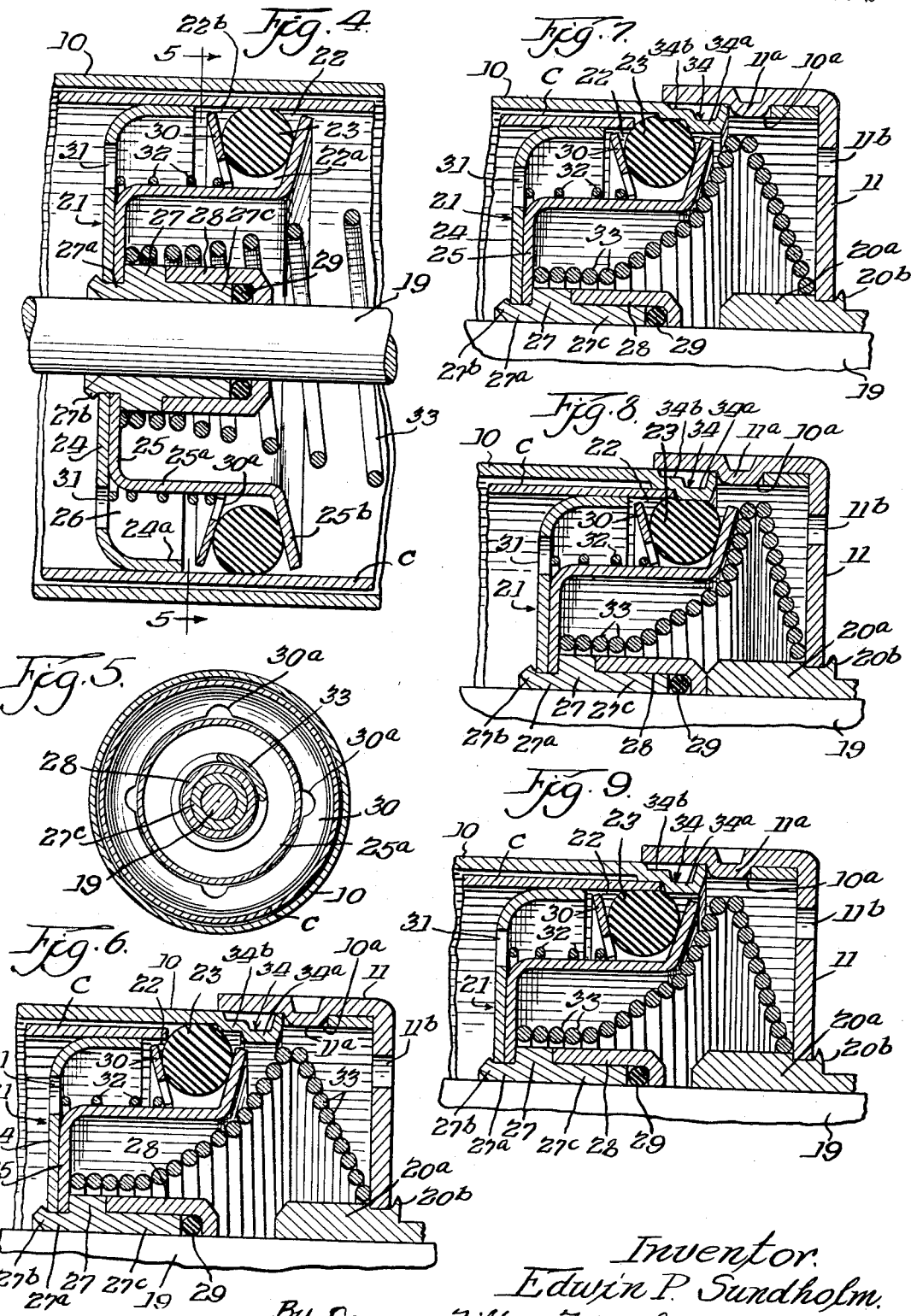

Nov. 5, 1968
E. P. SUNDHOLM
3,409,185
GREASE GUN PLUNGER ASSEMBLY
Filed April 20, 1965
3 Sheets-Sheet 3
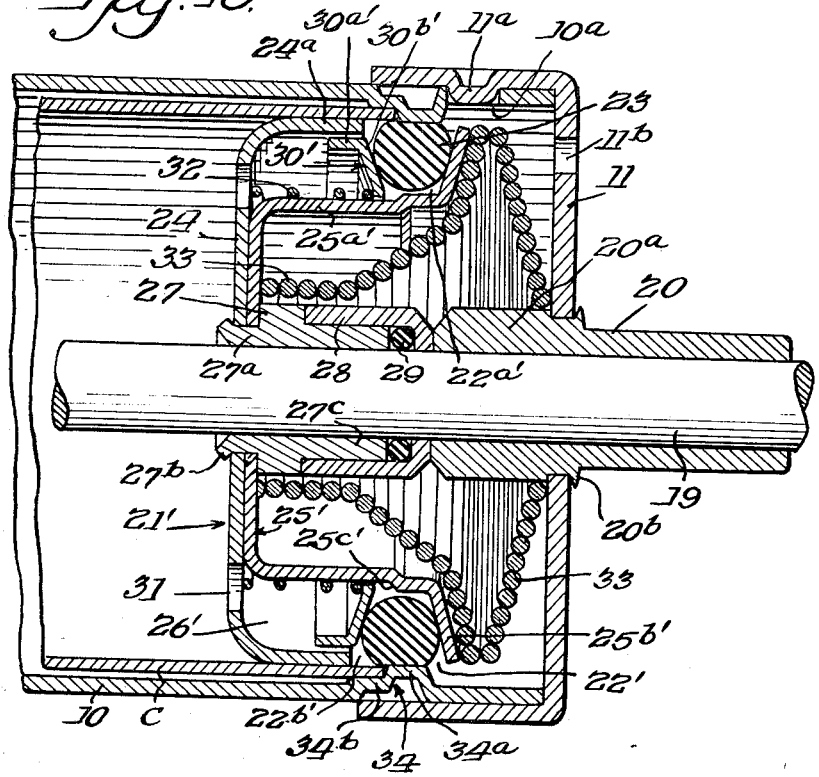
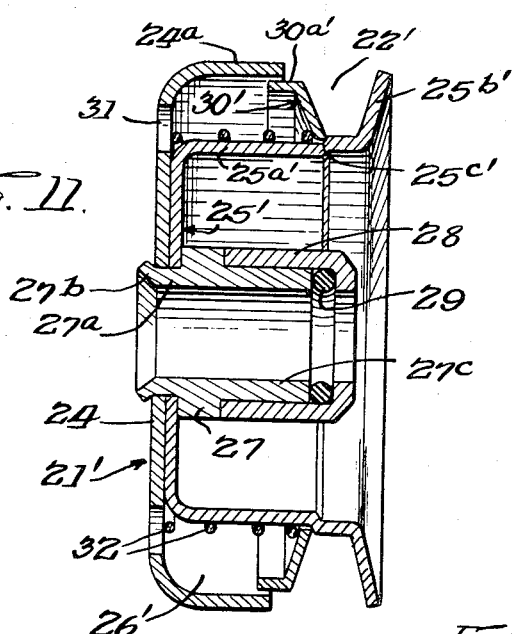
Inventor.
Edwin P. Sundholm.
By Dawson, Tilton, Fallon, Lungmus & Alexander.
Attys.

3,409,185
GREASE GUN PLUNGER ASSEMBLY
Edwin P. Sundholm, Albert City, Iowa 50510
Filed Apr. 20, 1965, Ser. No. 449,538
4 Claims. (Cl. 222—326)

This invention relates to a grease gun plunger assembly which is adapted for use in hand grease guns of the kind having a cylindrical grease container adapted for both bulk-filled greases and cartridge-packaged greases, and also having an axially-extending rod within the grease container. While it is preferred to employ the plunger assembly of this invention in the hand grease gun described in my co-pending application Ser. No. 444,156, filed Mar. 31, 1965, now Patent No. 3,300,100 of Jan. 24, 1967, entitled "Axially-Operated Hand Grease Gun," the plunger assembly of this invention may also be used in grease guns of the kind shown in my prior Patents 3,059,819 and 3,059,980.

The primary purpose of grease gun plunger assemblies is to urge the grease toward the forward end of the grease container on which is mounted the dispensing head. Where the grease is introduced directly into the grease container from a bulk source of grease, by one of the various filling methods, including hand-packing, suction-filling, and pressure-filling, the plunger assembly must seal against the inside of the grease container. If the grease gun is also adapted for use with cartridge-packaged greases, the plunger assembly must be capable of forming an alternate seal with the inside of the cartridge wall of the grease container, which will be of substantially smaller diameter than the internal diameter of the grease container of the gun.

For many years, grease gun plungers employed leather washers as sealing members. Such sealing members were displaced by molded cup-shaped sealing members formed of grease-resistant synthetic rubber such as neoprene. As described in my prior Patents 2,915,226 and 3,059,819, such molded plunger cups could be adapted to form an adequate seal over a range of diameters, thereby facilitating the use selectively of either bulk-filled greases or cartridge-packaged greases.

Molded plunger cups of the type just described depend on the resiliency of the rubber to maintain the sealing engagement either with the wall of the grease container or with the wall of the grease cartridge. When the plunger assembly has been used with grease cartridges for an extended period of time, the plunger cup does not readily restore itself to the diameter required for sealing engagement with the wall of the grease container itself. It is difficult to provide for the ready contraction or expansion needed with fully convertible grease guns. Moreover, the plunger cup tends to develop a set in its contracted condition within the grease cartridge. As a result, leakage of grease past the plunger assembly can occur when the grease gun is converted to bulk-filled greases, especially when it has been used for some time with cartridge-packaged greases.

The foregoing problems have become particularly acute in recent years, since the use of cartridge-packaged greases has grown to such an extent that it is now the loading procedure of choice. Many users therefore routinely employ cartridge-packaged greases. However, on occasion, the supply of cartridge-packaged grease may be temporarily exhausted, or it may be desired to apply some special grease which is only available in a bulk package, and then it is necessary to convert the gun back to use with a bulk-filled grease. Because of the primary and long-continued use of the gun for the cartridge-packaged greases, the desired conversion may not be satisfactory or even possible because the plunger assembly does not or will not form a tight seal at the larger diameter of the grease container.

It is therefore the principal object of the present invention to provide an improved grease gun plunger assembly which substantially overcomes the problems and difficulties described above. More specifically, it is an object to provide a grease gun plunger assembly having a sealing member which forms a positive and effective seal with either the grease container or the grease cartridge, even after long and continued use of the gun with cartridge-packaged greases. Further objects and advantages will be indicated in the following detailed specification.

This invention is shown in an illustrative embodiment in the accompanying drawing, wherein:

FIGURE 1 is a side elevational view of one kind of grease gun with which the plunger assembly of the present invention can be used;

FIGURE 2 is an enlarged fragmentary, sectional, side elevational view of the grease gun in FIG. 1 showing the relation of the plunger assembly of this invention to the grease container and the grease cartridge therein;

FIGURE 3 is a transverse sectional view taken on line 3—3 of FIG. 2;

FIGURE 4 is a fragmentary enlarged side-sectional view of the plunger assembly of this invention showing the assembly within the grease cartridge which is received in the grease container;

FIGURE 5 is a transverse sectional view taken on line 5—5 of FIG. 4;

FIGURE 6 is a side-elevational, sectional view showing the plunger assembly in the rearward portion of the grease container;

FIGURE 7 is a fragmentary, side-sectional view similar to FIG. 6 showing the plunger assembly in a slightly more rearwardly position;

FIGURE 8 is a fragmentary, side-sectional view similar to FIG. 7 but showing the plunger assembly in its rearward-most position;

FIGURE 9 is a fragmentary side-sectional view similar to FIG. 8 but showing the plunger assembly with the sealing member just inside the open rear end of the grease cartridge;

FIGURE 10 is a fragmentary enlarged side-sectional view of a plunger assembly of modified construction; and FIGURE 11 is a side-sectional view of the plunger assembly of FIG. 10 without the sealing ring after removal from the grease gun.

In FIG. 1 there is shown a grease gun of the kind described fully in my co-pending application Ser. No. 444,156, filed Mar. 31, 1965, entitled "Axially-Operated Hand Grease Gun." However, it is to be understood that the plunger assembly of this invention is adapted for use with other hand grease guns. The gun shown in FIG. 1 includes a cylindrical grease container 10 having a rear cap 11 permanently affixed thereto and a removable front cap 12 on which is mounted the axially-aligned high-pressure cylinder 13, which connects through an outlet check-valve 14 to a grease pipe 15 and a grease-fittting 16. The operating mechanism, including a stationary hand-grip 17 and a movable hand-grip 18, is mounted on the rear cap 11, and includes a spring-biased operating rod 19 which extends in the grease container 10 along the central axis thereof, shown more clearly in FIG. 2. A bushing or sleeve 20 is mounted in a central opening in rear cap 11 to slidably support the rod 19. As described in the cited co-pending application Ser. No. 444,156, rod 19 can be used for actuating the piston which cooperates with the high-pressure cylinder 13 by axial reciprocation. However, this added function of rod 19 is immaterial with respect to the plunger assembly of the present invention, which merely utilizes the rod as a slidable support. Any hand grease gun having a cylindrical grease container with an axially-extending rod therein is adaptable for use with the plunger assembly of the present invention, which will now be described in detail.

The plunger assembly, which is designated generally by the number 21, functions as a grease piston for urging grease toward the forward end of container 10, whether the grease is within the container itself or within a grease cartridge. As shown in FIG. 2, a grease cartridge C is inserted within the grease container 10, extending to the rear thereof adjacent to rear cap 11.

The piston means or plunger assembly 21 is slidably received on the rod 19. As shown in FIGS. 2 and 3, the outer peripheral portion of piston 21 is spaced inwardly from the inner surface of the container to permit the insertion of the wall of grease cartridge C therebetween. The outer peripheral portion of the piston 21 provides an annular recess 22 which faces the inner surface of container 10, and also the inner surface of the cartridge wall.

A sealing ring 23 is received in recess 22 for inward and outward movement therein. Ring 23 is formed of a resilient compressible material, such as a grease-resistant electromeric material. Synthetic rubber materials which are grease-resistant and can be formed by molding are particularly suitable, such as neoprene rubber. At least the outer portion of ring 23 which selectively engages the grease cartridge or the grease container is preferably arcuate. In the preferred embodiment as illustrated, ring 23 has a circular cross-section, and is therefore describable as an O-ring. Ring 23 should have an expanded diameter, which is preferably the normal, uncompressed diameter, at least as great as the internal diameter of grease container 10. Ring 23 is compressibly contractible to reduce the external diameter thereof while moving inwardly in recess 22 for an alternative sealing engagement with the inner surface of the wall of grease cartridge C.

A preferred construction of piston 21 is illustrated in FIGS. 4 to 9. The piston is formed from a cup-shaped front disc 24 which opens toward the rear of the gun, and receives the forward portion of a cup-shaped rear disc 25 which is of smaller diameter than the rearwardly extending portions 24a of disc 24 to provide an annular space 26 between wall 24a and the adjacent wall 25a of disc 25.

Any suitable means may be provided for slidably mounting the discs 24 and 25 on rod 19. In the illustration given, the sleeve 27 is slidably received on rod 19, and provides on its front end a reduced neck portion 27a which extends through central openings in the discs 24 and 25 and is united thereto by swaging at 27b. The fitting and swage connection of these parts is such as to form a grease-tight seal between sleeve 27 and discs 24 and 25.

A cap 28 is press-fitted over the reduced rearwardly extending portion 27c of the sleeve and provides a central opening through which the rod 19 extends. A small O-ring 29 is received within the annular space provided by the rearward portion of cap 28 and forms a sliding seal with rod 19.

The rearward-most portion of disc 25 provides an inclined wall or flange 25b which extends outwardly and rearwardly. A washer 30 is slidably received around wall 25a of disc 25. As shown in FIGS. 4 to 9, the washer 30 is positioned between front disc 24 and flange or wall 25b. Preferably washer 30 has a conical configuration, thereby providing a wall which extends outwardly and forwardly. In the embodiment shown, therefore, recess 22 is provided by the walls 25b and 30. Preferably, as shown, recess 22 is bounded by inwardly-converging side walls. In other words, recess 22 progressively decreases in width from the outer to the inner portion thereof. However, the walls of recess 22 can both extend transversely at right angles to the axis of container 10, or both walls can be inclined rearwardly or forwardly. The particular advantage of the inwardly converging walls, as shown, will subsequently be described.

In accordance with the present invention, grease passage means is provided extending from the front face of piston 21 to the bottom portion of recess 22 beneath the ring 23. The purpose of the grease passage is to permit grease pressure within the container 10 or the cartridge C to be transmitted to the inside of ring 23 to assist in urging the ring toward an expanded diameter. In the illustration given, front disc 24 was provided with circumferentially spaced openings, 31, the arrangement of which is shown more clearly in FIG. 3. Openings 31 permit grease to flow from in front of piston 24 into and through the annular space 26, which in turn communicates with the space 22a at the bottom of recess 22 through a plurality of notches 30a which are formed in the inner edge portion of washer 30, the arrangement of notches 30a being shown more clearly in FIG. 5. Any pressure exerted on grease within container 10 or cartridge C will therefore also act on the inside of ring 22, tending to urge the ring toward an expanded condition. Similarly, when piston 21 is being forced rearwardly during the loading of the grease gun, either by pressure-filling or cartridge-filling, the pressure exerted by the grease against piston 21 will be transmitted to the recess portion 22a and will act to urge the ring 23 to expand in condition.

Since the wall 24a of the front disc does not form a grease-tight seal with the wall of the cartridge C, and is spaced inwardly from the wall of the grease container 10, grease can pass between wall 24a and the grease cartridge C or container 10. However, this does not present any problem, and in fact, can perform a useful function if it is desired to omit the openings 31. Annular space 26 will also be filled with grease by virtue of the construction described even if openings 31 are omitted, and therefore grease pressure can be transmitted through the annular space 26 into the recessed bottom portion 22a. It will also be understood that neither the inner nor the outer edge portions of washer 30 form a sealing engagement, and therefore grease may flow around the inner and outer edges, then to recessed bottom portion 22a and also into the outer portion 22b of the recess which is forward of the line of sealing engagement of ring 23 with cartridge C or container 10. The grease pressure will also act in recessed portion 22b, but because of the limited surface area of ring 23 exposed to this pressure, ring 23 will still be urged outwardly by the pressure within recessed portion 22a which acts on a larger surface area of the ring 23. From what has been said, it will also be seen that the notches 30a can be omitted, while still achieving substantially the same method of operation, the grease passing from annular space 26 around the inner edge of washer 30 into the recessed bottom 22a rather than through the notches 30a.

With the construction just described, ring 23 is urged toward its fully expanded condition by the grease pressure and it is not necessary to rely entirely or even primarily on the resiliency of the ring 23. However, it is preferred to form ring 23 with a normal external diameter of container 10. Therefore, under normal conditions, ring 23 will tend to form a seal with the inner surface of container 10 even without the aid of grease pressure acting in the recessed portion 22a. Similarly, ring 23 can form a seal due to its own resilience when it is contracted for insertion in a grease cartridge, such as the cartridge C.

Where a passage is provided from the front face of piston 21 to the bottom portion 22a of the recess 22, greater assurance is attained that ring 23 will at all times seal either with the grease cartridge or with the container. This is particularly important where the plunger assembly has been used for a long period of time with cartridge-packaged greases. The tendency of the ring 23 to remain contracted and not to expand sufficiently to form a seal within the container if the gun is then used with a bulk-filled grease is corrected and overcome by the action of the grease pressure, as previously described.

Compressible spring means may also be provided for urging ring 23 to its fully expanded diameter while permitting the ring to contract to reduced diameters. In the illustrations given, there is provided a compression spring 32 which is received around the rearward extending wall 25a of disc 25, the front of the spring bearing against the front wall of disc 24 and the rear end of the spring bearing against the inner portion of movable washer 30. With this arrangement, spring 32 urges the inclined wall provided by washer 30 toward the inclined wall provided by disc portion 25b, thereby tending to narrow the recess 22 and urging ring 23 in an outward direction by a squeezing action.

The compressible spring means is also preferably arranged to urge ring 23 into sealing engagement with at least one surface of the peripheral portion of piston 21 which provides a recess 22. In the illustration given, the action of compression spring 32 on washer 30 forces the washer against the side of ring 23, and at the same time the other side of ring 23 is forced against the wall provided by the disc portion 25b, thereby forming seals, respectively, between the sides of ring 23 and the contacting wall surfaces provided by washer 30 and disc portion 25b.

For proper operation of the plunger assembly, it is desirable to provide a compression spring 33 extending between the rear side of the plunger assembly and rear cap 11. In the illustration given, shown more clearly in FIGS. 2 and 6, ring 33 has turns which taper in both directions from a central portion having a diameter approaching that of the inside of the cartridge C. The forward portion of the spring 33 extends over sleeve 27 and cap 28 to bear against the inside rear disc 25. The rear portion of spring 33 extends over the inwardly projecting portion of the sleeve 20 which is mounted in rear cap 11. As shown in FIG. 6, the spring is designed so that it can be compressed to a very compact condition within the rearward portion of the grease container. In the illustration given, inwardly extending portion 20a of bushing 20 serves as a stop by engaging the rear face of cap 28. The final rearward position of the plunger assembly is illustrated in FIG. 8 where cap 28 and sleeve portion 20a are shown in contact.

For cooperating with ring 23 during the insertion of the plunger assembly in the open rear end of a grease cartridge, the rearward portion of container 10 can be provided with an inwardly-extending annular section designated generally by the number 34, and including an inwardmost ridge portion 34a and an annular land portion 34b forwardly thereof which receives the rear end portion of the cartridge C. Ridge 34a is preferably positioned so that the ring 23 rides up on it, thereby causing the ring 23 to contract as the plunger assembly is forced toward the rear of the gun. However, ridge 34a is preferably located so that the ring 23 cannot pass over and beyond the ridge before the rearward movement of the plunger is positively terminated, as by the stop engagement of sleeve portion 20a with cap 28, as shown in FIG. 8. It will be seen that the ring 23 is resting approximately on the top of the ridge 34a, and that the ring has been forced to contract to a diameter small enough for insertion in the rear end of the cartridge C.

The cooperation between ring 23 and ridge 34a is illustrated more completely in the sequence of FIGS. 6 to 9. Looking first at FIG. 6, grease cartridge C is shown as it would appear on being inserted in the grease container 10. The forward portion of piston 21 is received within the open rear end of the cartridge C, and the rear edge of the cartridge wall is bearing against the front of ring 23, which is in an expanded condition, but grease pressure is not acting thereon. As the ring moves over land 34b and approaches the ridge 34a, the ring is forced to contract by the combined action of the rearwardly moving cartridge wall and the inward camming action of land 34b and ridge 34a. As shown in FIG. 7, the ring 23 contracts so that the rear edge of the cartridge C begins to move past the ring 23, and the ring 23 may move forwardly into the rear end of the cartridge to the position illustrated in FIG. 9. The spring 33 acts on the plunger assembly to promote the insertion while the rounded shape of ring 23 also assists the insertion. However, if difficulty is encountered, the ring can be still further contracted by moving to the position illustrated in FIG. 8. In this position, the rear edge of the cartridge C is in contact with the front shoulder of the ridge 34a, and the inner wall surface of the cartridge is in alignment with the inner face of ridge 34a. The ring then necessarily moves forwardly with the plunger assembly under the action of spring 34 to complete the insertion, as illustrated in FIG. 9.

In connection with the plunger assembly insertion procedure just described, it should be noted that the contraction and insertion of the ring 23 is not resisted by any grease pressure within the recesses 26 and 22a. The hydraulic action of the grease in urging the ring 23 toward an expanded condition does not operate until the plunger assembly or piston means 21 is in pressure contact with the grease, and this condition does not arise until after the plunger assembly has been fully inserted in the grease cartridge. This feature is highly advantageous in facilitating the contraction and insertion of the ring 23. Moreover, this ease of insertion is not attained at the expense of a positive and effective seal, since under actual conditions of use, the hydraulic grease pressure is available for urging ring 23 toward expanded condition. The greater the pressure exerted on the grease by the plunger assembly 21, the greater is the corresponding hydraulic pressure exerted on ring 23 to urge it to an expanded condition. This feature is of particular importance in the pressure filling of the grease gun, since the pressure of the grease being pumped into the gun in front of the plunger assembly 21 will be transmitted to the ring 23 to maintain an effective seal between the ring in its expanded condition and the inside of the container 10.

In the illustration given, the sleeve 20 extends through a central opening in the rear cap 11 and is connected thereto by swaging at 20b. The construction is not critical for the purpose of the present invention, and may be varied as desired. Also, in the illustration given, rear cap 11 is permanently affixed to the rear portion of container 10, but cap 11 may be threadedly connected thereto if desired. For the construction shown, the rear end portion of container 10 is provided with a plurality of circumferentially spaced holes 10a into which are extended projections 11a to interlock the cap 11 and the container 10. The rear wall of cap 11 may be provided with one or more vent openings 11b to prevent any suction from being developed within the space behind the plunger assembly 21.

Reference is now made to FIGS. 10 and 11 which illustrate a plunger assembly of modified construction. For convenience of reference, corresponding parts have been given the same numbers as for the plunger assembly previously described, and if the part has been modified, the number is primed. The principal modifications are in the shape of the washer 30' and the cylindrical portion 25a' of rear disc 25'.

The washer 30' still provides the conical wall, which in the embodiment of FIGS. 10 and 11 is designated as 30b', but at the outer periphery of the wall there is provided a forwardly extending cylindrical portion 30a', which is slidably received within the rearward portion of the cylindrical wall 24a of front disc 24. Clearance is provided between cylindrical portions 24a and 30a', and between the inner end of wall 30b' and the outside of cylindrical wall 25a', thereby permitting the washer 30' to slide freely within the rearward portion of the recess 26'. Facing the recess bottom 22a' and rearwardly of the front disc wall 24a, wall 25a' is provided with an outwardly offset shoulder 25c', which serves as a stop for the washer 30' when sealing ring 23 is removed, as shown more clearly in FIG. 11. It will be understood that compression spring 32 urges washer 30' toward the shoulder 25c'. When the sealing ring 23 is received within the recess 22', as shown in FIG. 10, the inner end of the wall 30b' will be positioned forwardly of the shoulder 25c'.

The embodiment of FIGS. 10 and 11 operates in a similar manner to the embodiment of the preceding figures. Grease enters the recess 26' through the openings 31 in front disc 24. While no openings are provided in wall 30b' of washer 30', the grease flows around the inner end of wall 30b' into the inner portion 22a' of the recess 22' to provide hydraulic pressure for urging the ring 23 toward an expanded diameter when the plunger assembly 21' is acting as a piston.

FIG. 10 shows the plunger assembly 21' in its rearwardmost position prior to insertion in the open rear end of the grease cartridge C. The ring 23 has been compressed inwardly and reduced in diameter by the inwardly formed barrel portion 34a, while the rear end of the cartridge C is resting on the annular step provided by the barrel portion 34b' and bearing against the forward side of the portion 34a. In this position, as previously described, the spring 23 causes the plunger assembly 21' (and the ring 23) to insert itself within the rear end of the grease cartridge. Until the grease is contacted, there will be no hydraulic pressure on the ring 23, thereby facilitating the contraction of the ring 23 and its insertion within the rear end portion of the grease cartridge C.

If it is desired to remove the plunger assemblies 21 or 21' from within the grease container 10, this can be accomplished by knocking out or withdrawing the pin 18a, which connects the handle 18 to the rear end of the plunger rod 19. With the front cap 12 removed, plunger assembly 21 or 21' with the rod 19 can be withdrawn or dropped out of the forward end of the container 10. The plunger assembly 21 or 21' can then be withdrawn from the rear of the rod. For example, the appearance of the plunger assembly 21' after being withdrawn from the rod is illustrated in FIG. 11. As also there illustrated, the sealing ring 23 can be removed by expanding it and pulling it outwardly over the end of the wall 25b' (or the wall 25a). With plunger assembly 21, the washer 30 will be urged rearwardly by the spring 32 until it contacts the wall 25b, while with the plunger assembly 21', the rearward movement of the washer 30' is limited by the shoulder 25c'. This is advantageous in reinserting the ring 23, and also in maintaining the correct alignment of washer 30' with respect to the walls 24a and 25a'. The annular wall 30a' also prevents the rear ends of grease cartridges from tending to catch on the washer, as might occur with plunger assembly 21 where the outer periphery of washer 30 is rearwardly of the end of wall 24a, thereby leaving a space therebetween in which the end of the cartridge might catch.

While in the foregoing specification this invention has been described in relation to a specific preferred embodiment thereof and many details have been set forth for purpose of illustration, it will be apparent to those skilled in the art that the invention is susceptible to additional embodiments and that certain of the details set forth herein can be varied considerably without departing from the scope of the invention.

I claim:
1. In combination with a hand grease gun having a cylindrical grease container adapted for both bulk-filled greases and cartridge-packaged greases, and an axially-extending rod within said container, a plunger assembly comprising:
 (a) piston means slidably received on said rod for urging grease toward the forward end of said container,
  the outer peripheral portion of said piston being spaced inwardly from the inner surface of said container to permit the insertion of a grease cartridge wall therebetween,
  said outer peripheral portion providing an annular recess facing said inner container surface;
 (b) a sealing ring received in said recess for inward and outward movement therein,
  said ring being formed of a resilient compressible material and having an expanded diameter at least as great as the internal diameter of said container for sealing engagement therewith,
  said ring defining an arcuate peripheral portion and being compressibly contractable to reduce the external diameter thereof while moving inwardly in said recess for alternative sealing engagement with the inner surface of said grease cartridge wall; and
 (c) grease passage means extending from the front face of said piston to the bottom portion of said recess beneath said ring,
  whereby grease pressure within said container is transmitted to the inside to assist in urging said ring to said expanded diameter.

2. The grease gun plunger assembly of claim 1 wherein there is also provided compressible spring means urging said ring to said expanded diameter while permitting said ring to contract to said reduced diameter.

3. In combination with a hand grease gun having a cylindrical grease container adapted for both bulk-filled greases and cartridge-packed greases, and an axially-extending rod within said container, a plunger assembly comprising: piston means slidably received on said rod for urging grease toward the forward end of said container, the outer peripheral portion of said piston being spaced inwardly from the inner surface of said container to permit the insertion of a grease cartridge wall therebetween, said outer peripheral portion providing an annular recess facing said inner container surface; a sealing ring received in said recess for inward and outward movement therein, said ring being formed of a resilient compressible material and having an expandable diameter at least as great as the internal diameter of said container for sealing engagement therewith, said ring defining an arcuate peripheral portion and being compressibly contractable to reduce the external diameter thereof while moving inward in said recess for alternative sealing engagement with the inner wall of said grease cartridge; and grease passage means extending from the front face of said piston to the bottom portion of said recess beneath said ring, whereby grease pressure within said container is transmitted to the inside of said ring to urge said ring to said expanded diameter.

4. In combination with a hand grease gun having a cylindrical grease container adapted for both bulk-filled greases and cartridge-packed greases and an axially-extending rod within said container, a plunger assembly comprising: piston means slidably received on said rod for urging grease forward of said container, said piston means comprising a cup-shaped front disk opening toward the rear of said container, a cup-shaped rear disk of smaller diameter received within said front disk to provide an annular space therebetween and defining an outwardly-extending wall, a washer received on said rear disk between said front disk and said rear disk wall for movement in said annular space between said disks, said washer and said outwardly-extending wall of said rear disk defining an annular recess, and compressible spring means received in said annular space for urging said washer toward said wall, one of said recess-defining surfaces being inclined so that the width of said recess enlarges in an outward direction; a resilient, compressible sealing ring of grease-resistant rubber defining a circular cross section received in said recess, said recess being of sufficient depth to accommodate said ring in its contracted radial position, said ring defining an arcuate sealing surface for alternative sealing engagement with the inner wall of said grease cartridge; and grease passage means communicating between the front surface of said plunger and the portion of said recess inward of said ring, whereby said grease under pressure is forced through said passage means for engaging the inner surface of said ring for urging it in radial expansion.

References Cited

UNITED STATES PATENTS

| | | | |
|---|---|---|---|
| 1,234,972 | 7/1917 | Trist | 92—254 X |
| 1,496,536 | 6/1924 | Heyen | 92—250 |
| 2,080,856 | 5/1937 | Thomas | 222—326 X |
| 2,985,495 | 5/1961 | Neuman | 222—326 X |

ROBERT B. REEVES, *Primary Examiner.*

HADD S. LANE, *Assistant Examiner.*